(12) United States Patent
Ishida

(10) Patent No.: US 8,240,705 B2
(45) Date of Patent: Aug. 14, 2012

(54) AIRBAG APPARATUS

(75) Inventor: Takeshi Ishida, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 77 days.

(21) Appl. No.: 12/805,584

(22) Filed: Aug. 6, 2010

(65) Prior Publication Data

US 2011/0101655 A1 May 5, 2011

(30) Foreign Application Priority Data

Sep. 11, 2009 (JP) ................... 2009-210816

(51) Int. Cl.
B60R 21/16 (2006.01)

(52) U.S. Cl. ..................... 280/729; 280/738; 280/743.1; 280/743.2

(58) Field of Classification Search .................. 280/729, 280/738, 743.1, 743.2
See application file for complete search history.

(56) References Cited

U.S. PATENT DOCUMENTS

| | | | | |
|---|---|---|---|---|
| 3,907,327 A | * | 9/1975 | Pech | 280/729 |
| 3,929,350 A | * | 12/1975 | Pech | 280/729 |
| 4,043,572 A | * | 8/1977 | Hattori et al. | 280/738 |
| 5,542,695 A | * | 8/1996 | Hanson | 280/729 |
| 5,577,765 A | * | 11/1996 | Takeda et al. | 280/729 |
| 6,616,177 B2 | * | 9/2003 | Thomas et al. | 280/729 |
| 7,731,232 B2 | * | 6/2010 | Higuchi | 280/739 |
| 7,798,524 B2 | * | 9/2010 | Fischer et al. | 280/739 |
| 7,862,073 B2 | * | 1/2011 | Thomas | 280/729 |

FOREIGN PATENT DOCUMENTS

JP 2007-145098 A 6/2007

* cited by examiner

Primary Examiner — Toan To
(74) Attorney, Agent, or Firm — McGinn IP Law Group, PLLC

(57) ABSTRACT

An airbag is composed a first airbag which is formed in a manner that a plurality of frame bodies of a substantially same triangle ring shape are horizontally aligned with respective central space portions of the frame bodies communicated with each other and connected with no gap, and a second airbag which is formed in a manner that the central space portions of the air bag body are blocked with blocking members. When the first airbag is deployed and inflated with gas generated by an inflator in a triangle ring shape upon a collision, air from the atmosphere is taken in to the central space portions of the first airbag from check valves and intake-exhaust holes, and the second air bag is deployed and inflated by using the airbag body as an outer frame and retaining the air inside thereof.

13 Claims, 4 Drawing Sheets

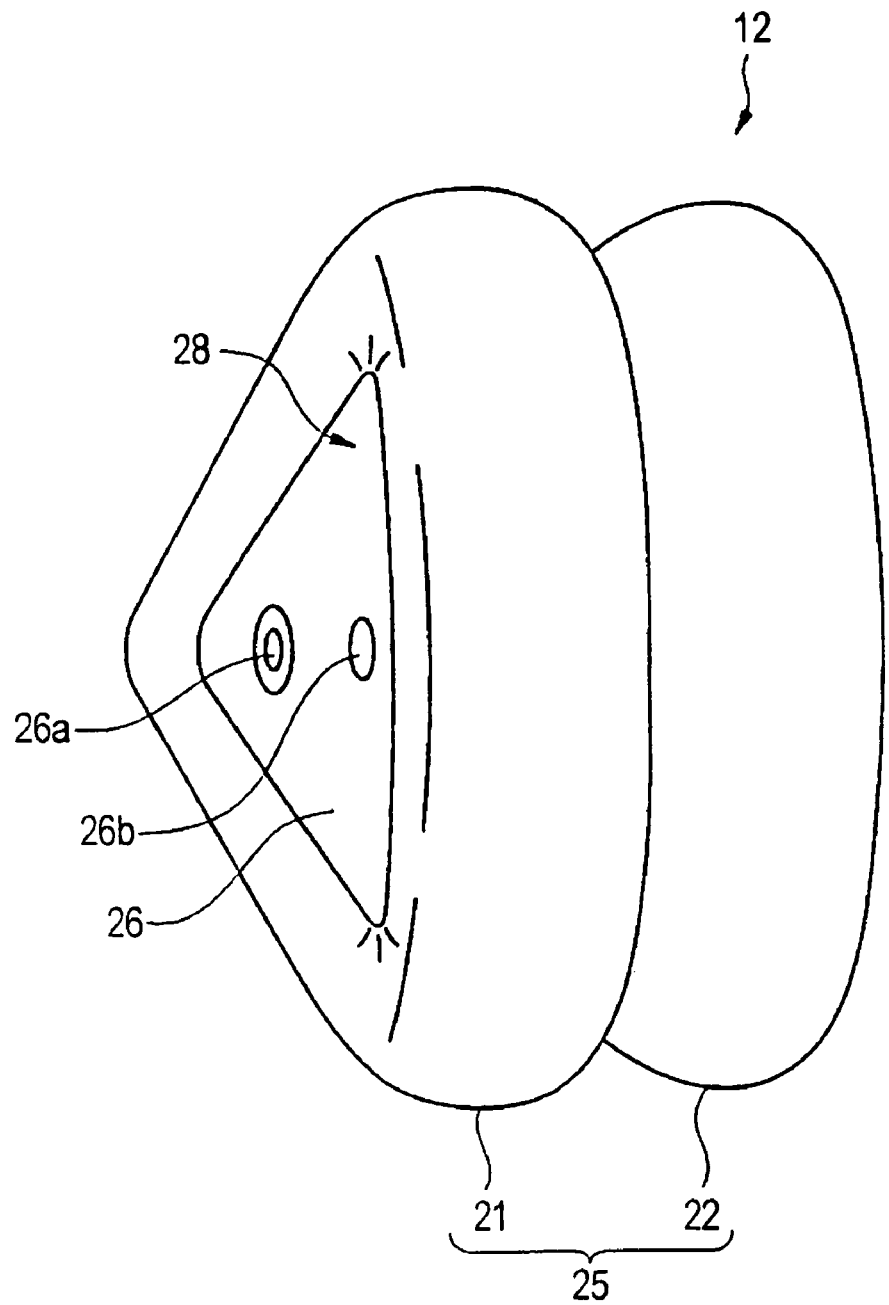

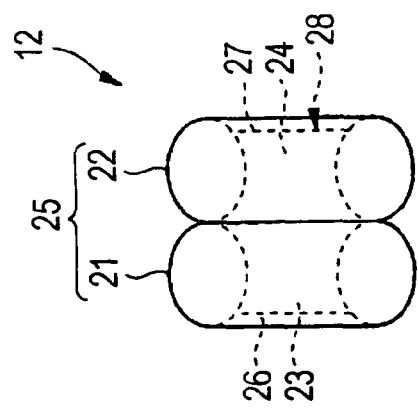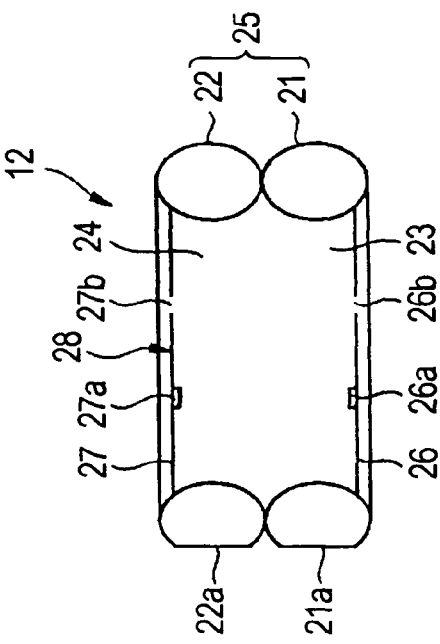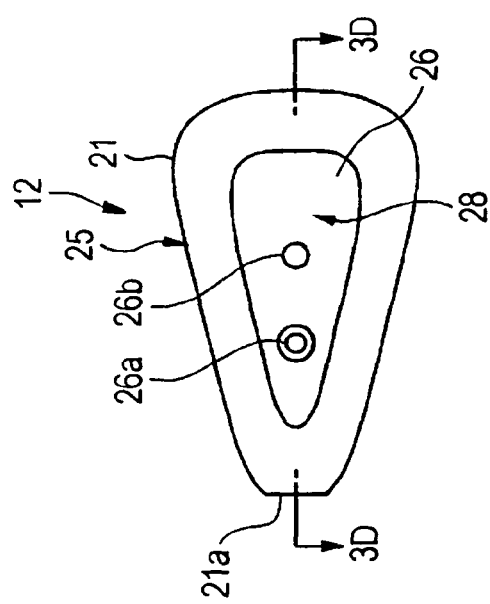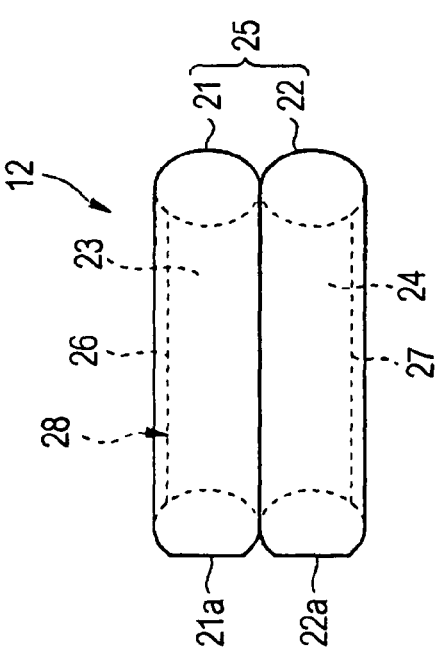

AIRBAG APPARATUS

CROSS REFERENCES TO RELATED APPLICATIONS

The present application claims priority from Japanese Patent Application No. 2009-210816 filed on Sep. 11, 2009, and is hereby incorporated by reference in its entirety.

BACKGROUND OF THE INVENTION

1. Field of the Invention

The present invention relates to an airbag apparatus that protects an occupant of a vehicle with gas generated by an inflator upon a collision of the vehicle.

2. Description of the Related Art

Vehicles are conventionally equipped with an airbag apparatus that is inflated with gas generated by an inflator to protect an occupant in case of an emergency where the vehicles are subject to a strong impact.

Japanese Unexamined Patent Application Publication No. 2007-145098 (hereinafter, referred to as Document 1) discloses an airbag apparatus comprising a first thin airbag apparatus that is stored in a folded state in an instrument panel and deployed along an inner surface of a windshield glass by being supplied with gas generated in an inflator so as to prevent the head of an occupant from contacting with the windshield glass, and a second thin airbag apparatus that is deployed along an upper surface of the instrument panel so as to prevent the head of the occupant from contacting with the instrument panel.

However, the air bag apparatus disclosed in Document 1 requires an inflator with a large gas delivery to inflate the first and second airbags, which requires a larger inflator and limits a storing location of the airbag apparatus, as well as increases weight and cost. Furthermore, the increase in the gas delivery from the inflator is not favorable. In addition, Document 1 discloses a technology where tips of the first and second airbags are connected by a flexible non-inflation member so as to improve an initial restraint performance on the head of the occupant upon a frontal impact crash. However the non-inflation member simply uses a reactive force of the first and second airbags to move away from each other for restraining the head of the occupant, and the initial restraint of the head of the occupant may not be performed with an appropriate pressure.

SUMMARY OF THE INVENTION

The present invention is made in view of the above, and an object of the present invention is to provide an airbag apparatus that uses only a small gas delivery from an inflator, achieves reduction in size, weight and cost, can be mounted at various locations, and decelerates and protects an occupant with an appropriate pressure.

An airbag apparatus according the present invention includes gas generating means for generating gas upon a vehicle collision and the like, a first airbag that is inflated in a frame shape with the generated gas, a second airbag that is inflated by taking in air from the atmosphere upon the inflation of the first airbag and formed by using the first airbag as an outer frame and retaining the atmosphere inside the first airbag.

The airbag apparatus according to the present invention offers excellent effects: the airbag apparatus uses only a small gas delivery from an inflator, achieves reduction in size, weight and cost, can be mounted at various locations, and decelerates and protects an occupant with an appropriate pressure.

BRIEF DESCRIPTION OF THE DRAWINGS

FIG. 2 is a perspective view of an inflated airbag according to the embodiment of the present invention.

FIGS. 3A to 3D are a schematic diagram illustrating a structure of the airbag according to the embodiment of the present invention.

DESCRIPTION OF THE PREFERRED EMBODIMENTS

An embodiment of the present invention will hereunder be described with reference to the drawings.

Figure 1:
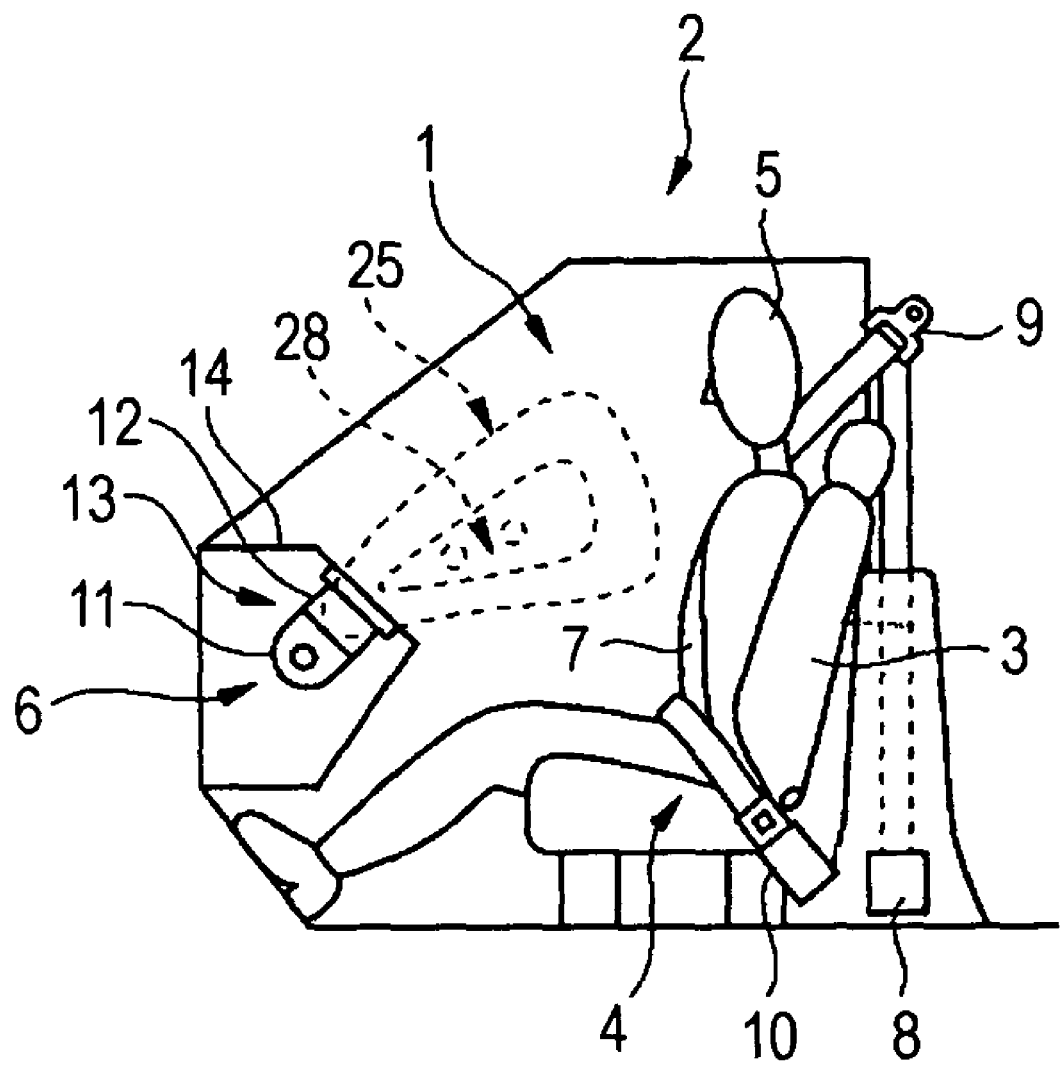
FIG. 1 is a schematic diagram illustrating a front passenger seat equipped with an airbag apparatus according to an embodiment of the present invention.

In FIG. 1, a reference numeral 1 represents an occupant protection apparatus that in installed at a front seat portion 2 of a vehicle. The occupant protection apparatus 1 is mainly composed of, for example, a seat belt apparatus 4 of a passenger seat 3 in the front seat portion 2 and an airbag apparatus 6 that protects mainly a front side of a sitting passenger.

The seat belt apparatus 4 is, for example, a three-point seat belt and is composed of a belt portion for holding the back, shoulder and the like of an occupant 5 and restraining the body of the occupant at a passenger seat 3, a retractor 8 that is mounted at a lower part of an unshown center pillar to wind and store a belt portion 7, a relay anchor 9 that is mounted at an upper part of the center pillar to insert and guide the belt portion 7 pulled upward from retractor 8, and a seat belt locking portion 10.

Furthermore, the seat belt apparatus 4 has a well-known pretensioner function wherein the retractor 8 instantly winds the belt portion 7 so as to restrain the passenger 5 in case of an emergency where the vehicle is subject to a strong impact and a well-known force limiter function that maintains a load applied to the belt portion 7 at a prescribed amount so as to allow the belt portion 7 to be pulled from the retractor 8.

The airbag apparatus 6 is composed of an air bag module 13 including an inflator 11 that is gas generating means for generating gas upon a collision and an airbag 12 that is deployed with the gas. The airbag apparatus 6 is stored, for example, inside an instrument panel 14 which is located in front of the passenger seat 3.

Upon a vehicle collision, in the airbag module 13 of the airbag apparatus 6, the inflator 11 of the air bag is activated to generate gas based on a signal from an unshown sensor that detects the collision. Then the airbag 12 is deployed with the gas as shown with dashed lines in FIG. 1 so as to catch, decelerate and protect a region from the head to the chest of the passenger 5 that falls forward.

FIGS. 2, 3A to 3D show states of the airbag 12 deployed and inflated from the airbag module 13. FIGS. 3A and 3B are respectively a left side view and a front view, FIG. 3C is a bottom view of FIG. 3A and FIG. 3D is a sectional view taken along line 3D-3D in FIG. 3A. As shown in these figures, the airbag 12 is mainly composed of a first airbag 25 and a second airbag 28. The airbag 25 is formed with a plurality of frame bodies with a substantially same triangle ring shape. In the present embodiment, two frame bodies 21 and 22 are used.

The frame bodies 21 and 22 are horizontally aligned with central space portions 23 and 24 of the respective frame bodies 21 and 22 communicated with each other, and connected with no gap. The second air bag 28 is formed in a manner that the central space portions 23 and 24 of the air bag 25 are blocked with blocking members 26 and 27 made of a common airbag material such as nylon.

For the material of blocking members 26 and 27, a same material as the first airbag 25 may be used, and a different material may be used.

Respective outer end portions of the frame bodies 21 and 22 of the first airbag 25 are connected to the inflator 11 of the airbag module 13. The airbag 25 take in the gas generated by the inflator freely from gas inlets 21a and 22a that are formed respectively at the outer end portions and is deployed and inflated in a triangle ring shape with the gas generated by the inflator 11.

The second airbag 28 is provided with check valves 26a and 27a respectively at the blocking members 26 and 27, which forms left and right side surfaces of the second airbag 28. The check valves 26a and 27a are a flat valve or the like that freely take in air from the atmosphere inward. Moreover, the second airbag 28 is provided with intake-exhaust holes 26b and 27b that freely take in and exhaust air from the atmosphere so as to maintain an inner pressure at a prescribed level when the occupant hits the airbag 12.

More specifically, when the inflator 11 generates gas, with which the first airbag 25 is deployed and inflated in a triangle ring shape upon a vehicle collision and the like, a negative pressure is generated in the central space portions 23 and 24 of the first airbag 25, whereby air from the atmosphere is charged to the central space portions 23 and 24 from the check valves 26a and 27a and the intake-exhaust holes 26b and 27b, and the second airbag 28 is deployed and inflated, using the first airbag 25 as an outer frame and retaining the air inside thereof.

Figure 4A:
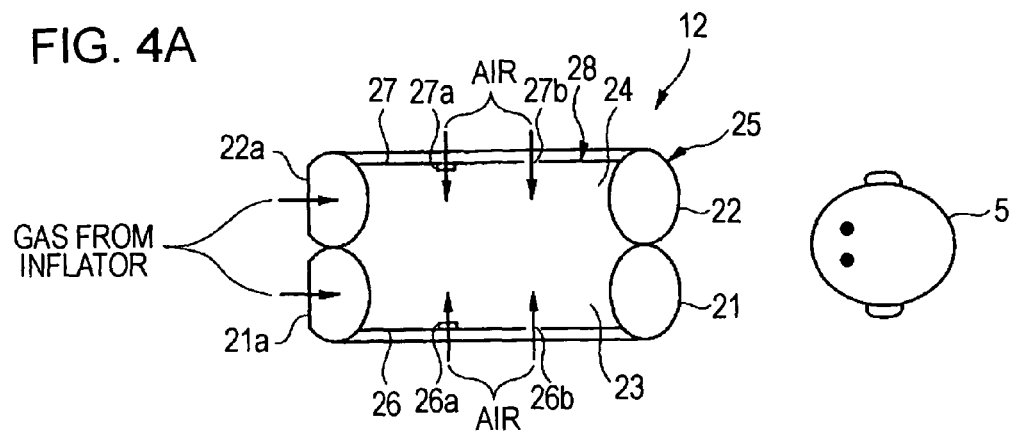
FIG. 4A to 4C are a schematic diagram illustrating a state in which a passenger contacts with the inflated airbag according to the embodiment of the present invention.

Next, an operation of the airbag apparatus 6 upon a collision of the vehicle and the like will be described with reference to FIG. 4. When the vehicle collides, the unshown sensor that detects the collision, and the inflator is activated and generate gas based on an signal from this sensor. Then the first airbag 25 is deployed and inflated in a triangle ring shape with the gas generated by the inflator 11. Accordingly, a negative pressure is generated in the central space portions 23 and 24 of the first airbag 25, whereby atmosphere is charged to the central space portions 23 and 24 from the check valves 26a and 27a and the intake-exhaust holes 26b and 27b, and the second airbag 28 is deployed and inflated, using the first airbag 25 as an outer frame and retaining the air inside thereof (see FIG. 4A).

Figure 4B:
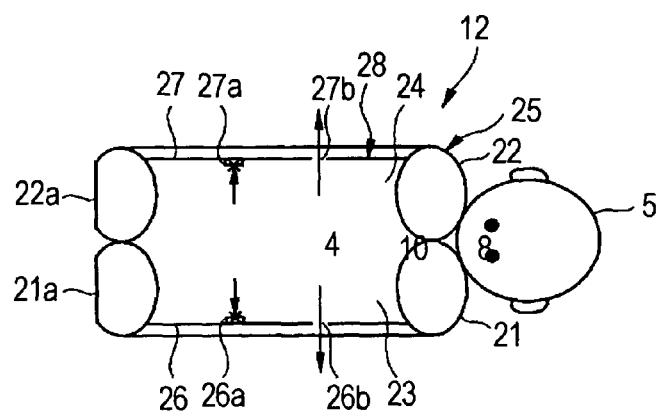

Then, as shown in FIG. 4B, when the occupant falls forward due to an impact of the Collision and contacts with the back surface of the airbag 12, a pressure increases inside both the first airbag 25 and second airbag 28 of the airbag 12. When the inner pressure of the second airbag 28 increases, the check valves 26a and 27a close and thus introducing air from the atmosphere and discharging inner air from the check valves 26a and 27a is prevented. Furthermore, since the inner pressure of the second airbag 28 increases, introducing air from the atmosphere through the intake-exhaust holes 26b and 27b is halted and the inner air begins to be discharged with the inner pressure of the second airbag being maintained at a prescribed level.

Figure 4C:
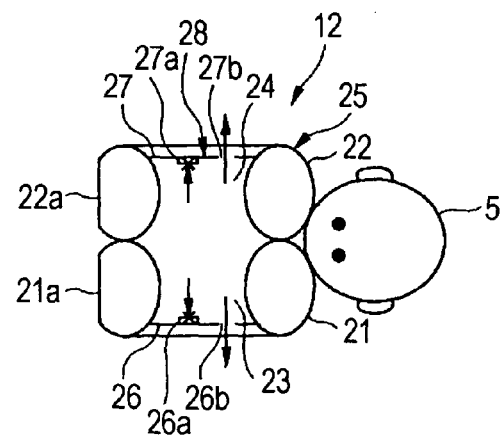

Then, as shown in FIG. 4C, when the occupant heavily hits the airbag, a spring force generated due to a deformation of the shape of the first airbag 25 and the suppression of the increase in the inner pressure by the discharge from the intake-exhaust holes 26b and 27b gradually decelerates the rushing occupant, alleviates the impact of the collision, hold the occupant between the frame bodies 21 and 22 of the first airbag 25, and thereby protects the occupant favorably.

As described above, the airbag body 12 according to the present embodiment is composed of the first airbag body 25 which is formed with the plurality of (two) frame bodies 21 and 22 of a substantially same triangle ring shape horizontally aligned with the respective central space portions 23 and 24 of the frame bodies 21 and 22 communicated with each other and connected with no gap, and the second airbag 28 which is formed in a manner that the central space portions 23 and 24 of the air bag 25 are blocked with the blocking members 26 and 27 made of a common airbag material such as nylon. When the inflator 11 generates gas, with which the first airbag 25 is deployed and inflated in a triangle ring shape upon a vehicle collision or the like, a negative pressure is generated in the central space portions 23 and 24 of the first airbag 25, whereby air from the atmosphere is charged to the central space portions 23 and 24 from the check valves 26a and 27a and the intake-exhaust holes 26b and 27b, and the second airbag 28 is deployed and inflated, using the first airbag 25 as an outer frame and retaining the air inside thereof.

Since the gas generated by the inflator 11 is used to inflate and deploy only the first airbag and a necessary gas delivery from the inflator 11 is small, the size, weight and cost of the inflator lithe can be reduced. Accordingly, the size, weight and cost of the airbag apparatus 6 can be reduced, and the airbag apparatus 6 can have a high versatility and can be mounted on various locations such as a seat, a headrest, and an inside of a pillar.

Furthermore, since the gas generated by the inflator 11 is used to inflate and deploy only the first airbag, the amount of the gas generated by the inflator 11 to be discharged after the activation of the airbag 12 is also small, which is favorable.

In addition, since the second airbag 28 performs intake with the check valves 26a and 27a and intake and exhaust from the intake-exhaust holes 26b and 27b, optimal deployment, optimal inflation time setting and optimal cushioning property setting can be achieved easily by properly setting the size of the check valves 26a and 27a and intake-exhaust holes 26b and 27b. This may be accomplished by omitting any of the check valves 26a and 27a and intake and the intake-exhaust holes 26b and 27b. For example, only either of the check valves 26a or 27a may be provided, and it is possible to not provide the intake-exhaust holes 26b and 27b.

The check valves 26a and 27a may be interposed at a connecting part of the frame bodies 21 and 22 of the airbag body 25. While the frame bodies 21 and 22 are horizontally aligned in this embodiment, they may be vertically aligned.

While the first airbag 25 is composed the two frame bodies 21 and 22 in this embodiment, it may be composed of three or more frame bodies.

The shape of the frame bodies 21 and 22 of the airbag 25 may be another shape other than the triangle ring shape such as pentagon ring.

Furthermore, the first airbag 15 may be configured so as to discharge the gas which is generated by the inflator 11 and introduced to the inside of the first airbag 25.

What is claimed is:

1. An airbag apparatus, comprising:
a gas generator that generates a gas upon a vehicle collision;
a first airbag that is inflated in a frame shape with the generated gas; and
a second airbag that is inflated by taking in atmosphere upon the inflation of the first airbag and is formed by using the first airbag as an outer frame and retaining the atmosphere inside the first airbag.

2. The airbag apparatus according to claim 1, wherein the second airbag comprises a check valve that allows only intake of air from the atmosphere upon the inflation of the first airbag.

3. The airbag apparatus according to claim 1, wherein the second airbag comprises an intake-exhaust hole that performs intake and exhaust of air from the atmosphere.

4. The airbag apparatus according to claim 1, wherein a plurality of frame bodies with a substantially same triangle ring shape are aligned with respective central space portions communicated with each other and connected with no gap.

5. The airbag apparatus according to claim 4, wherein the second airbag is formed by blocking central space portions of the plurality of aligned ring-shaped frame bodies of the first airbag.

6. The airbag apparatus according to claim 1, wherein the first airbag comprises a plurality of frame bodies with a substantially same triangle ring shape.

7. The airbag apparatus according to claim 6, wherein the frame bodies are aligned with central space portions of the frame bodies communicated with each other.

8. The airbag apparatus according to claim 6, wherein one of the plurality of frame bodies abuts another one of the plurality of frame bodies.

9. The airbag apparatus according to claim 6, wherein each of the plurality of frame bodies abuts an adjacent one of the plurality of frame bodies.

10. The airbag apparatus according to claim 6, further comprising:
    blocking members that block central space portions of the frame bodies to form the second air bag.

11. The airbag apparatus according to claim 1, wherein the frame shape has a triangular ring shape.

12. The airbag apparatus according to claim 1, wherein, upon the vehicle collision a deformation of the frame shape of the first airbag generates a spring force.

13. The airbag apparatus according to claim 1, wherein the generated gas inflates only the first airbag.

* * * * *